United States Patent
Okada (10) Patent No.: US 6,549,682 B2
(45) Date of Patent: *Apr. 15, 2003

(54) IMAGE DATA PROCESSING APPARATUS AND METHOD, AND PROVISION MEDIUM

(75) Inventor: Hidehiko Okada, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/344,252

(22) Filed: Jun. 25, 1999

(65) Prior Publication Data

US 2003/0039407 A1 Feb. 27, 2003

(30) Foreign Application Priority Data

Jun. 29, 1998 (JP) ............................. 10-181925

(51) Int. Cl.$^7$ ............................................ G06K 9/32
(52) U.S. Cl. ............................... 382/298; 345/3.3
(58) Field of Search ..................... 382/298, 299, 382/294; 348/441, 445, 446; 345/132, 3.3, 3.4, 1.1

(56) References Cited

U.S. PATENT DOCUMENTS

| | | | | |
|---|---|---|---|---|
| 5,113,455 A | * | 5/1992 | Scott | 382/47 |
| 5,808,688 A | * | 9/1998 | Sung | 348/441 |
| 6,044,178 A | * | 3/2000 | Lin | 382/260 |
| 6,178,272 B1 | * | 1/2001 | Segman | 382/298 |

FOREIGN PATENT DOCUMENTS

| | | |
|---|---|---|
| EP | 0 574 142 A | 12/1993 |
| EP | 0 588 499 A | 3/1994 |
| EP | 0 644 684 A | 3/1995 |
| EP | 0 710 925 A | 5/1996 |
| EP | 0 814 429 A | 12/1997 |

OTHER PUBLICATIONS

Sugiyama et al "An advanced scan format converter with flexible and high quality signal processing", IEEE 1997.*
Asada et al "A 2.7in 1.3M pixel driver–intergrated poly–Si TFT–LCD for multimedia projectors" IEEE International Solid State Circuits Conference 1996.*
Nakamura et al "3.3–inch, 1.9M pixel intergrated driver poly–Si TFT–LCD for HDTV projector" IEEE International Solid–State Circuits Conference 1994.*

* cited by examiner

Primary Examiner—Yon J. Couso
(74) Attorney, Agent, or Firm—Frommer Lawrence & Haug LLP; William S. Frommer; Darren M. Simon (57) ABSTRACT

An image data processing apparatus wherein patterns obtained on the basis of common image information shared by a plurality of pre-conversion pixels with one post-conversion pixel are stored in a calculation data selector, and there is decided a pattern conforming with the pixel data inputted to the calculation data selector via an A/D converter and a frame memory. A calculation coefficient selector selects the calculation coefficients corresponding to the pattern thus decided, and outputs the selected coefficients to a calculator. Then the calculator calculates new pixel data by the use of such calculation coefficients and pixel data inputted thereto. In this apparatus, the post-conversion image formed by converting the number of its pixels can be displayed clearly.

4 Claims, 10 Drawing Sheets

| INPUT FORMAT \ OUTPUT FORMAT | VGA | SVGA | XGA | SXGA | UXGA |
|---|---|---|---|---|---|
| VGA 640×480 | 1:1<br>1.0 | 4:5<br>1.3 | 5:8<br>1.6 | 1:2<br>2.0 | 2:5<br>2.5 |
| SVGA 800×600 | 5:4<br>0.8 | 1:1<br>1.0 | 25:32<br>1.3 | 5:8<br>1.6 | 1:2<br>2.0 |
| XGA 1024×768 | 8:5<br>0.6 | 32:25<br>0.8 | 1:1<br>1.0 | 4:5<br>1.3 | 16:25<br>1.6 |
| SXGA 1280×1024 | 2:1<br>0.5 | 8:5<br>0.6 | 5:4<br>0.8 | 1:1<br>1.0 | 4:5<br>1.3 |
| UXGA 1600×1200 | 5:2<br>0.4 | 2:1<br>0.5 | 25:16<br>0.6 | 5:4<br>0.8 | 1:1<br>1.0 |

FIG.4

| X11 | X12 | X13 | X14 | X15 | X16 |
|---|---|---|---|---|---|
| X21 | X22 | X23 | X24 | X25 | X26 |
| · | · | · | · | · | |
| · | · | · | · | · | |
| X51 | · | · | · | X55 | |
| | | | | | |

VGA FORMAT

| y11 | y12 | y13 | y14 | y15 | y16 | y17 | y18 | y19 |
|---|---|---|---|---|---|---|---|---|
| y21 | y22 | y23 | y24 | y25 | y26 | y27 | y28 | y29 |
| · | · | · | · | · | · | · | · | |
| · | · | · | · | · | · | · | · | |
| · | · | · | · | · | · | · | · | |
| · | · | · | · | · | · | · | · | |
| y81 | · | · | · | · | · | · | y88 | |

XGA FORMAT

|  | x1,1 |  | x1,2 |  | x1,3 |
|---|---|---|---|---|---|
| y1,1 | y1,2 | y1,3 | | y1,4 | |
| 1 | 0.6 | 0.4 | 1 | 0.2 | 0.8 |
| y2,1 | y2,2 | y2,3 | | y2,4 | |
| 0.6 | 0.36 | 0.24 | 0.6 | 0.12 | 0.48 |
| 0.4 | 0.24 | 0.16 | 0.4 | 0.08 | 0.32 | x2,1

FIG. 7

PATTERN A

1

PATTERN B

0.6 | 0.4

PATTERN C 0.8 | 0.2

PATTERN D

PATTERN E

PATTERN F

FIG. 8

|  | | | | BOUNDARY | | | |
|---|---|---|---|---|---|---|---|
| FIRST QUADRANT | | | | SECOND QUADRANT | | | |
| y1,1 A | y1,2 B | y1,3 A | y1,4 C | y1,5 C | y1,6 A | y1,7 B | y1,8 A |
| y2,1 B | y2,2 D | y2,3 B | y2,4 E | y2,5 E | y2,6 B | y2,7 D | y2,8 B |
| y3,1 A | y3,2 B | y3,3 A | y3,4 C | y3,5 C | y3,6 A | y3,7 B | y3,8 A |
| y4,1 C | y4,2 E | y4,3 C | y4,4 F | y4,5 F | y4,6 C | y4,7 E | y4,8 C |
| y5,1 C | y5,2 E | y5,3 C | y5,4 F | y5,5 F | y5,6 C | y5,7 E | y5,8 C |
| y6,1 A | y6,2 B | y6,3 A | y6,4 C | y6,5 C | y6,6 A | y6,7 B | y6,8 A |
| y7,1 B | y7,2 D | y7,3 B | y7,4 E | y7,5 E | y7,6 B | y7,7 D | y7,8 B |
| y8,1 A | y8,2 B | y8,3 A | y8,4 C | y8,5 C | y8,6 A | y8,7 B | y8,8 A |
| FOURTH QUADRANT | | | | THIRD QUADRANT | | | |

BOUNDARY (horizontal, between row 4 and row 5)

FIG.10

| | x1,1 | | | x1,2 | |
|---|---|---|---|---|---|
| y1,1 0.4 | y1,2 0.23 | 0.15 | y1,3 0.4 | y1,4 | ~0.08 |
| y2,1 0.23 | y2,2 0.14 | 0.09 | y2,3 0.23 | y2,4 | ~0.05 |
| 0.15 | 0.09 | 0.06 | 0.15 | | ~0.03 |
| y2,1 | | | | | |

FIG.11

PATTERN a

| 0.4 | 0.23 |
|---|---|
| 0.23 | 0.14 |

PATTERN b

| 0.15 | 0.4 | 0.08 |
|---|---|---|
| 0.09 | 0.23 | 0.16 |

PATTERN c

| 0.31 | 0.31 |
|---|---|
| 0.19 | 0.19 |

PATTERN d

| 0.06 | 0.15 | ~0.03 |
|---|---|---|
| 0.15 | 0.4 | ~0.08 |
| 0.09 | 0.08 | ~0.02 |

PATTERN e

| 0.13 | 0.13 |
|---|---|
| 0.31 | 0.31 |
| 0.06 | 0.06 |

PATTERN f

| 0.25 | 0.25 |
|---|---|
| 0.25 | 0.25 |

FIG.12

| x1,1 | x1,2 | x1,3 | x1,4 | x1,5 |
|---|---|---|---|---|
| a | b | c | b | a |
| x2,1 | x2,2 | x2,3 | x2,4 | x2,5 |
| b | d | e | d | b |
| x3,1 | x3,2 | x3,3 | x3,4 | x3,5 |
| c | e | f | e | c |
| x4,1 | x4,2 | x4,3 | x4,4 | x4,5 |
| b | d | e | d | b |
| x5,1 | x5,2 | x5,3 | x5,4 | x5,5 |
| a | b | c | b | a |

IMAGE DATA PROCESSING APPARATUS AND METHOD, AND PROVISION MEDIUM

BACKGROUND OF THE INVENTION

The present invention relates to an image data processing apparatus and method, and a provision medium, and more particularly to those adapted to calculate, in converting the number of pixels to change the size of an image to be displayed, post-conversion pixel data according to the area ratio of two image pictures superposed mutually, on the assumption that the size of the pre-conversion image and the size of the post-conversion image are equal to each other.

Figure 13:
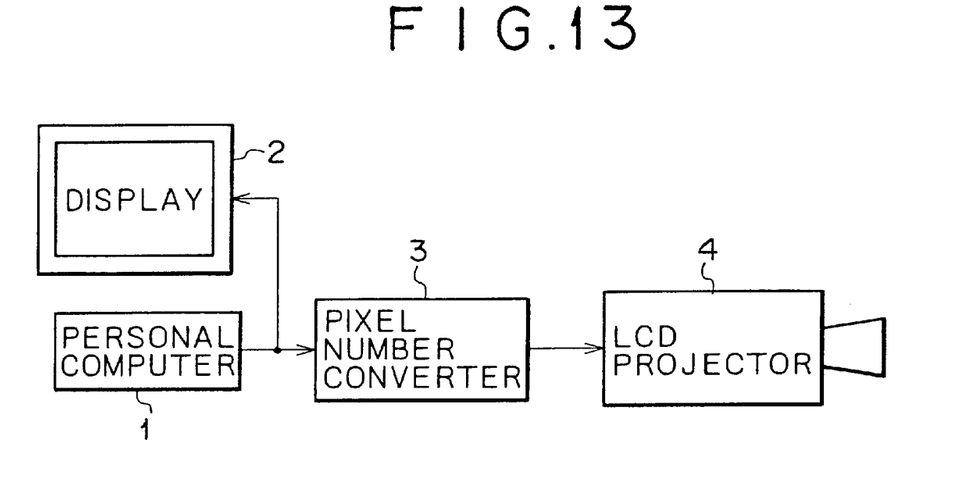
FIG. 13 is a block diagram showing an exemplary configuration of a conventional image display system.

FIG. 13 is a block diagram showing an exemplary configuration of a conventional image display system. Image data generated in a personal computer 1 is outputted therefrom to a display unit 2 and an LCD (Liquid Crystal Display) projector 4 via a pixel number converter 3.

In case the number of pixels composing a picture on the LCD projector 4 is different from the number of pixels composing a picture on the display unit 2, the image data outputted to the LCD projector 4 is processed in the pixel number converter 3 where the number of its pixels is converted, and then the converted image is projected onto an unshown screen or the like. The pixel number conversion executed by the pixel number converter 3 is performed in a nearest neighbor mode, a bilinear mode or a cubic mode.

Here, an explanation will be given on an example of converting a VGA (Video Graphics Array) format of 640× 480 pixels into an XGA (extended Graphics Array) format of 1024×768 pixels in a cubic mode, i.e., an example of converting 5 pixels into 8 pixels.

Figure 14:
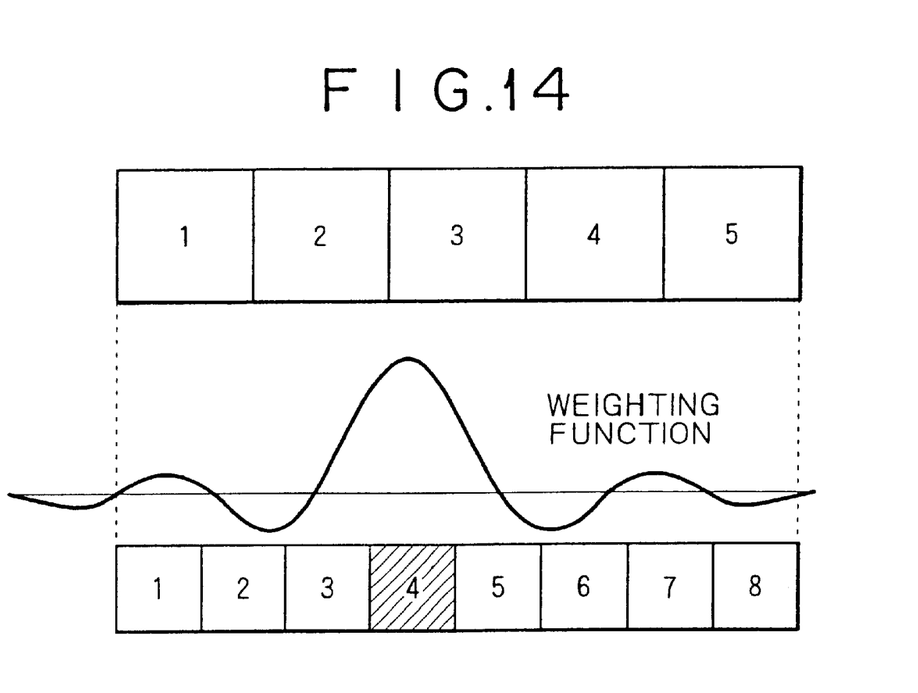
FIG. 14 is a diagram for explaining a cubic mode.

In the cubic mode, the weighting function shown in FIG. 14 is employed to convert the number of pixels. In the example of FIG. 14, it is assumed typically that the width of 5 VGA pixels and the width of 8 XGA pixels are dimensionally equal to each other. And when determining pixel data such as chroma of the 4th XGA pixel, the weighting function is so set that its maximum value is positioned in the 4th XGA pixel.

With regard to the weighting function thus set, the data of the 4th XGA pixel is determined by executing a convolutional calculation by the use of a numerical value which is obtained at the intersection of the weighting function with the perpendicular line drawn from each of the 5 VGA pixels to the weighting function.

In converting an original pixel array into a desired pixel array, the above-described pixel number conversion according to the cubic mode or the like is performed with reference to a plurality of pixels for determining the data of one pixel, so that any image whose chroma is sharply changed as in a character string is affected harmfully by unrelated pixels to consequently cause some blur or deformation of the characters.

SUMMARY OF THE INVENTION

It is therefore an object of the present invention to provide improvements capable of realizing, in conversion of the number of pixels, superior conversion of any image of character or the like by adopting the common image information, such as the area ratio for example, shared by a plurality of pre-conversion pixels with a post-conversion subject pixel.

According to an aspect of the present invention, as defined in the appended claim 1, there is provided an image data processing apparatus which comprises a first storage means for storing the input pixel data of a first image; a second storage means for storing coefficients of plural calculation expressions; a select means for selecting a desired calculation expression corresponding to the position of the pixel in the second image; and a calculator means for calculating the pixel data of the second image by using the pixel data of the first image read out from the first storage means to be used in a calculation of the expression selected by the select means, and also by using the coefficients read out from the second storage means to be used in the calculation of the expression selected by the select means.

The calculation expression is determined by the pixel array pattern of said first image corresponding to a subject pixel of said second image when the picture of said first image and the picture of said second image, which are mutually equal in size, are superposed on each other, and said coefficient is determined by common image information shared by the subject pixel of said second image and the relevant pixel of said first image corresponding to said subject pixel.

The common image information is an area ratio.

The select means divides said second image into blocks composed of a predetermined number of pixels, and selects, per block, the calculation expression corresponding to the position of the pixel in said second image.

According to another aspect of the present invention, as defined in the appended claim 5, there is provided an image data processing method which comprises a first storage step of storing the input pixel data of a first image; a second storage step of storing coefficients of plural calculation expressions; a select step of selecting a desired calculation expression corresponding to the position of the pixel in the second image; and a calculation step of calculating the pixel data of the second image by the use of the pixel data of the first image, read out from the first storage step, to be used in a calculation of the expression selected at the select step and also by the use of the coefficients, read out from the second storage step, to be used in a calculation of the expression selected at the select step.

And according to a further aspect of the present invention, as defined in the appended claim 6, there is provided a provision medium for providing a program readable by a computer to execute a predetermined process which comprises a first storage step of storing the input pixel data of the first image; a second storage step of storing coefficients of plural calculation expressions; a select step of selecting a desired calculation expression corresponding to the position of the pixel in the second image; and a calculation step of calculating the pixel data of the second image by the use of the pixel data of the first image, read out from the first storage step, to be used in a calculation of the expression selected at the select step and also by the use of the coefficients, read out from the second storage step, to be used in a calculation of the expression selected at the select step.

In the image data processing apparatus of claim 1, the image data processing method of claim 5 and the provision medium of claim 6, the input pixel data of a first image is stored while coefficients of plural calculation expressions are stored, then a desired calculation expression corresponding to the position of the pixel in the second image is selected, subsequently the pixel data of the first image to be used in a calculation of the selected expression is read out while the coefficients to be used in a calculation of the selected expression are read out, and thereafter the pixel data of the second image is calculated by the use of the read pixel data and the read coefficients.

The above and other features and advantages of the present invention will become apparent from the following description which will be given with reference to the illustrative accompanying drawings.

DETAILED DESCRIPTION OF THE PREFERRED EMBODIMENTS

Hereinafter some preferred embodiments of the present invention will be described in detail. In order to clarify the relationship of correspondence between the following embodiments and the means of the present invention defined respectively in the appended claims, the features of the present invention will be mentioned with addition of the corresponding embodiment (one example) in the parentheses posterior to each means. However, it is to be understood that such description does not limit each means to the related example alone.

The image data processing apparatus of claim 1 comprises a first storage means (e.g., frame memory 22 in FIG. 2) for storing the input pixel data of a first image; a second storage means (e.g., calculation coefficient selector 28 in FIG. 2) for storing coefficients of plural calculation expressions; a select means (e.g., calculation data selector 23 in FIG. 2) for selecting a desired calculation expression corresponding to the position of the pixel in a second image; and a calculator means (e.g., calculator 24 in FIG. 2) for calculating the pixel data of the second image by using the pixel data of the first image read out from the first storage means to be used in a calculation of the expression selected by the select means, and also by using the coefficients read out from the second storage means to be used in the calculation of the expression selected by the select means.

Figure 1:
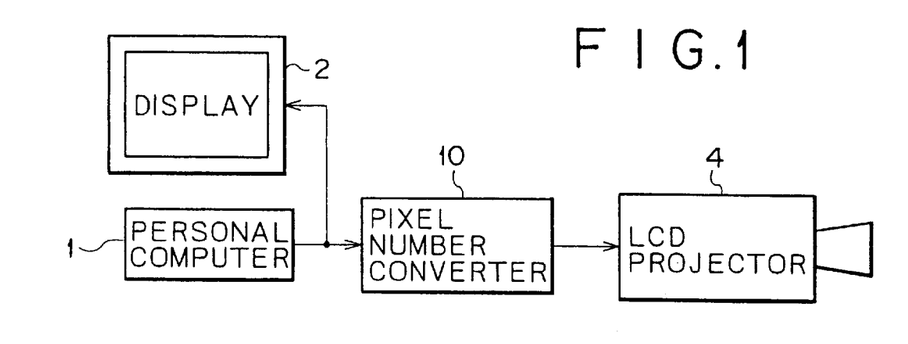
FIG. 1 is a block diagram showing the configuration of a preferred embodiment which represents an image display system where the image data processing apparatus of the present invention is applied.

FIG. 1 shows the configuration of a preferred embodiment representing an image display system where the present invention is applied. Image data produced in a personal computer 1 is outputted to a display unit 2 and a pixel number converter 10. The image data inputted to the pixel number converter 10 is changed into a desired number of pixels conforming with an LCD projector 4, and then is outputted to the LCD projector 4.

Figure 2:
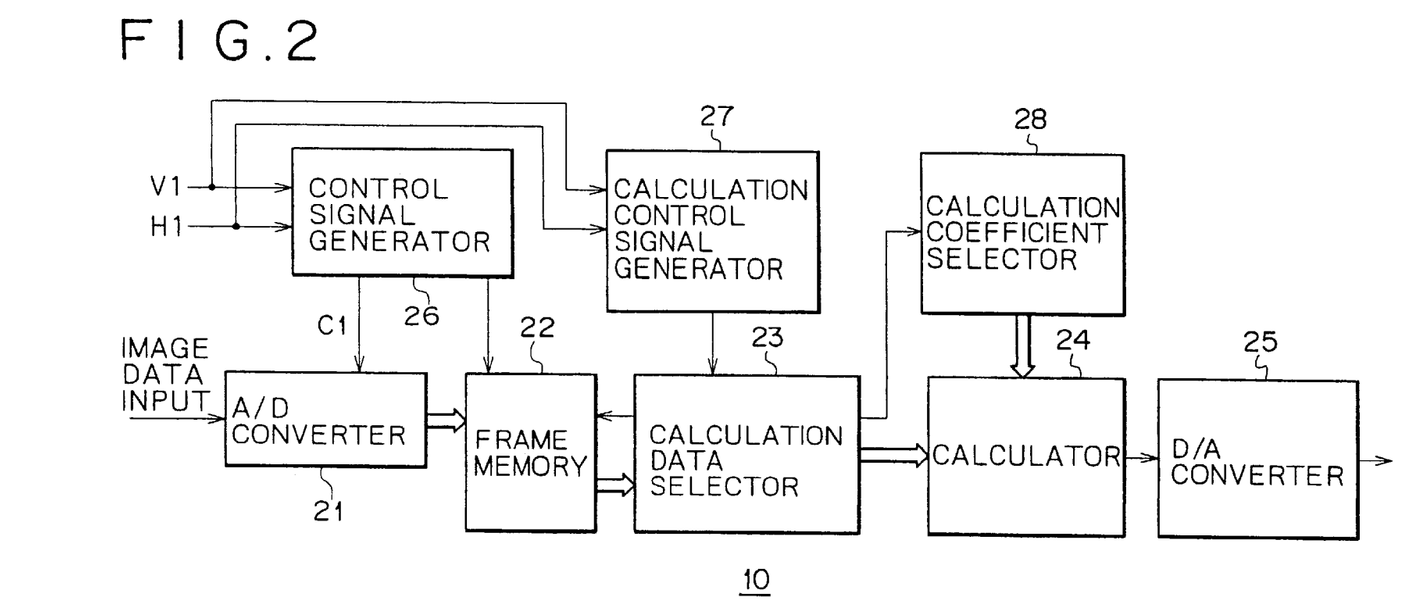
FIG. 2 is a block diagram showing the internal configuration of a pixel number converter.

FIG. 2 is a block diagram showing the internal configuration of the pixel number converter 10. The image data outputted from the personal computer 1 is supplied to an A/D (Analog/Digital) converter 21. Meanwhile, a vertical sync signal V1 and a horizontal sync signal H1 outputted from the personal computer 1 are supplied to a control signal generator 26 and a calculation control signal generator 27. Further the control signal generator 26 generates a clock signal C1 synchronized with the input vertical sync signal V1 and horizontal sync signal H1, and then supplies such clock signal C1 to the A/D converter 21.

The A/D converter 21 converts the input analog image data into digital image data in accordance with the clock signal C1 and then outputs the converted data to a frame memory 22. In case the output from the personal computer 1 is digital image data, it is a matter of course that such data is supplied directly to the frame memory 22. And the image data of one frame is stored in the frame memory 22 in accordance with the control signal obtained from the control signal generator 26.

The calculation control signal generator 27 generates a new horizontal sync signal V2 and a new horizontal sync signal H2 in synchronism with the input vertical sync signal V1 and horizontal sync signal H1 respectively, and outputs a newly generated address to a calculation data selector 23. Subsequently, in accordance with the input vertical sync signal V2 and horizontal sync signal H2, the calculation data selector 23 reads out the pixel data, which is required in the calculation, from the entire pixel data stored in the frame memory 22, and then supplies the read pixel data to a calculator 24.

The calculation data selector 23 holds a table of patterns for use in converting the number of pixels, and selects a desired pattern corresponding to the pixel data read out from the frame memory 22, and then supplies the data of the selected pattern to a calculation coefficient selector 28. Subsequently the calculation coefficient selector 28 selects a calculation coefficient required for pixel number conversion corresponding to the pattern data obtained from the calculation data selector 23, and then outputs the selected coefficient to the calculator 24.

The calculator 24 calculates new (post-conversion) pixel data by the use of the calculation coefficient outputted from the calculation coefficient selector 28 and the pixel data outputted from the calculation data selector 23, and then outputs the new pixel data to a D/A converter 25.

The D/A converter 25 converts the digital image data, which has been calculated in and outputted from the calculator 24, into analog image data, and then outputs the same to the LCD projector 4. In this manner, the process of calculation is executed per pixel and such process is repeated, so that the total pixels constituting one picture are outputted.

Next, an explanation will be given on a process of converting the number of pixels executed in the pixel number converter 10. First, enlargement rates and reduction rates conforming with the differences between input formats and output formats will be described below with reference to FIG. 3. Relative to formats of signals inputted to the pixel number converter 10 and formats of signals outputted therefrom, there are known VGA (Video Graphics Array), SVGA (Super VGA), XGA (extended Graphics Array), SXGA (Super XGA), and UXGA (Ultra XGA).

Figure 3:
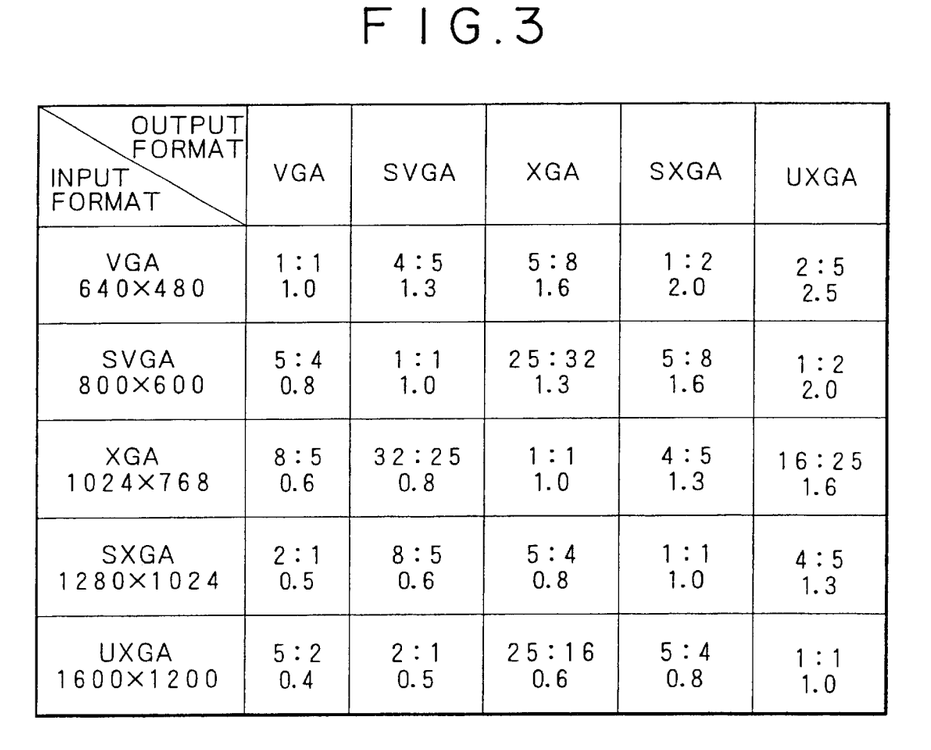
FIG. 3 shows pixel ratios conforming with the differences between input and output formats.

In FIG. 3, input formats are shown vertically in a column, and output formats are shown horizontally in a row. And the rates of the input-format pixel numbers to the output-format pixel numbers are shown in the intersections of the input and output formats. Each of the numerical values shown thereunder denotes the relevant ratio (output pixel number/input pixel number) obtained by rounding the second-place decimal fraction. For example, when an input format is VGA and an output format is XGA, the rate of the input-format pixel number to the output-format pixel number is 5:8, and the relevant ratio thereof is 1.6. In this example, the numbers $M_1 \times N_1$ of pixel data in the first image correspond to 640×480, and the numbers $M_2 \times N_2$ of pixel data in the second image correspond to 1024×768, respectively. The above ratio signifies that the number of input pixels is to be changed into a number 1.6 times, i.e., to be enlarged.

The number of horizontal pixels and the number of vertical pixels in any of such VGA, SVGA, XGA and UXGA formats are at a rate of 4:3, whereas those in the SXGA format are at a rate of 5:4. Therefore, in conversion into or from the SXGA format, the enlargement rate or reduction rate becomes different depending on whether the number of horizontal pixels or that of vertical pixels is employed as a basis. In consideration of such condition, the calculations relative to the SVGA format in Table of FIG. 3 are represented by the values obtained on the basis of the number of horizontal pixels.

Figure 4:
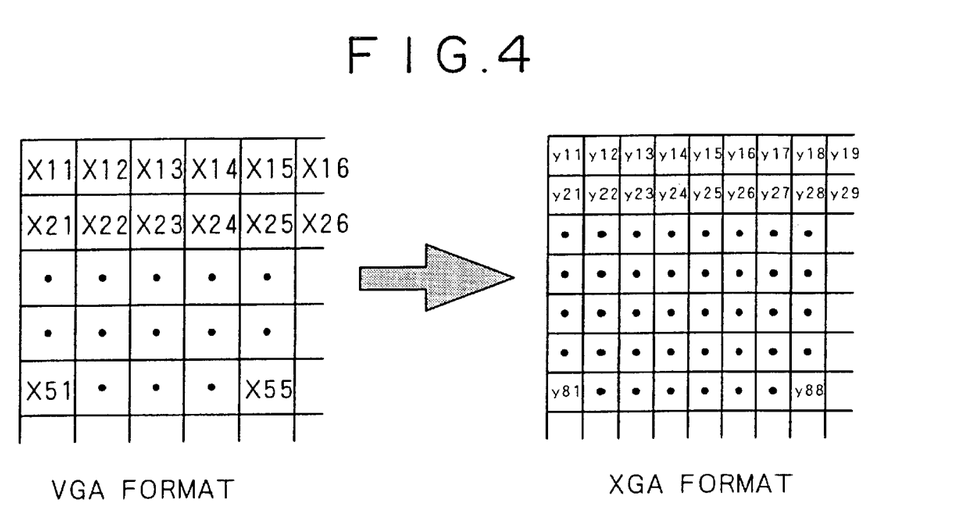
FIG. 4 is an explanatory diagram showing how the number of pixels is converted in an example of converting a VGA format into an XGA format.

The following explanation will be given on a process of pixel number conversion in an exemplary case where the input format is VGA and the output format is XGA. In this case, the rate of the input-format pixel number to the output-format pixel number is 5:8 as shown in FIG. 3, so that this process is executed to convert, as shown in FIG. 4, a 5×5 pixel block (hereinafter referred to as image block) which is composed of pixels $x_{m,n}$ (where m, n=1 to 5), into an 8×8 image block composed of pixels $y_{v,w}$ (where v, w=1 to 8). Thus, one picture of the VGA-based display format is constituted of 128 horizontal 5×5 image blocks and 96 vertical 5×5 image blocks. Similarly, one picture of the XGA-based display format is constituted of 128 horizontal 8×8 image blocks and 96 vertical 8×8 image blocks.

Therefore, conversion of the entire picture is completed by repeating, 128 times horizontally and 96 times vertically, a process of converting an image block of VGA-format 5×5 pixels into an image block of XGA-format 8×8 pixels. The following description relates to an example where an image block of VGA-format 5×5 pixels is converted into an image block of XGA-format 8×8 pixels. And it is supposed here that the image block of 5×5 pixels and the image block of 8×8 pixels are equal in area to each other.

Figure 5:
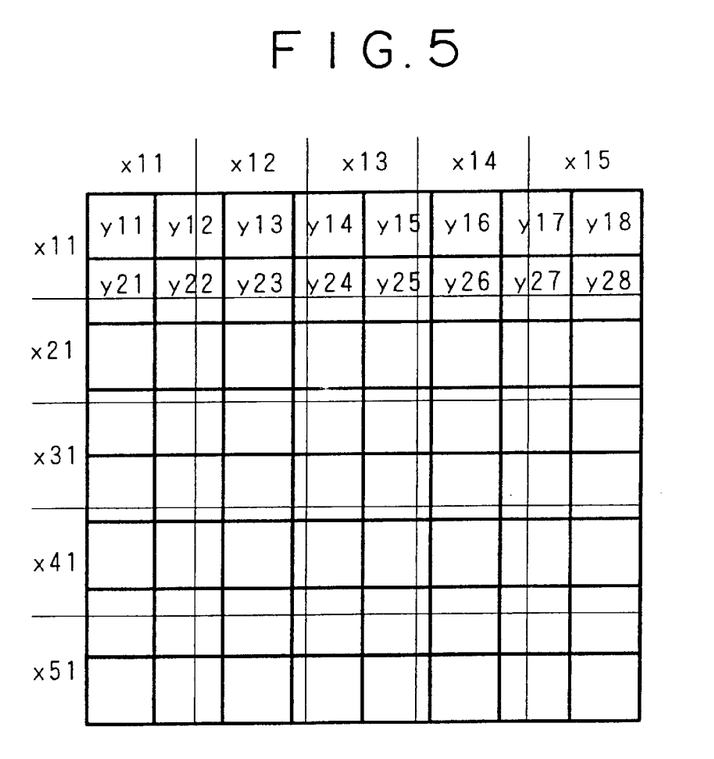
FIG. 5 is a diagram of an exemplary case where a VGA-format picture and an XGA-format picture are superposed mutually.

FIG. 5 is a diagram where the image block of 5×5 pixels and the image block of 8×8 pixels shown in FIG. 4 are mutually superposed. In this diagram, VGA-format pixel $x_{1,1}$ is superposed on XGA-format pixels $y_{1,1}$, $y_{1,2}$, $y_{2,1}$ and $y_{2,2}$; and pixel $x_{1,2}$ is superposed on pixels $y_{1,2}$, $y_{1,3}$, $y_{1,4}$, $y_{2,2}$, $y_{2,3}$ and $y_{2,4}$. Similarly, other pixel $x_{m,n}$ is superposed on a plurality of pixels $y_{v,w}$.

Figure 6:
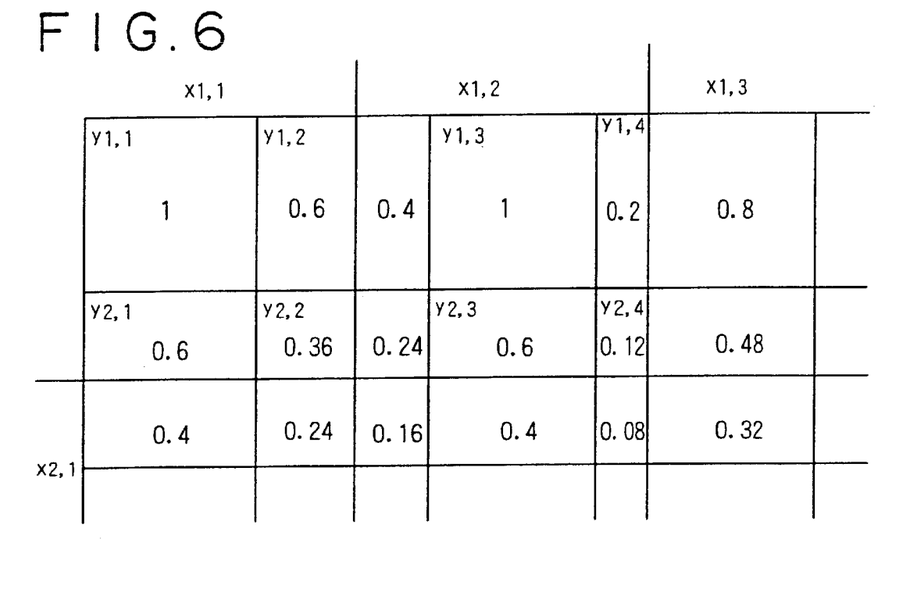
FIG. 6 is a partially enlarged view of FIG. 5.

Viewing the above in further detail with reference to FIG. 6, pixel $x_{1,1}$ is composed of 100% (1) of pixel $y_{1,1}$, 60% (0.6) of pixels $y_{1,2}$ and $y_{2,1}$, and 36% (0.36) of pixel $y_{2,2}$. Similarly, pixel $x_{1,2}$ is composed of 40% of pixel $y_{1,2}$, 100% of pixel $y_{1,3}$, 20% of pixel $y_{1,4}$, 24% of pixel $y_{2,2}$, 60% of pixel $y_{2,3}$, and 12% of pixel $y_{2,4}$. Also other pixel $x_{m,n}$ is composed of a plurality of pixels $y_{v,w}$. And the proportions of such pixels $y_{v,w}$ are dependent on the positions thereof.

Figure 7:
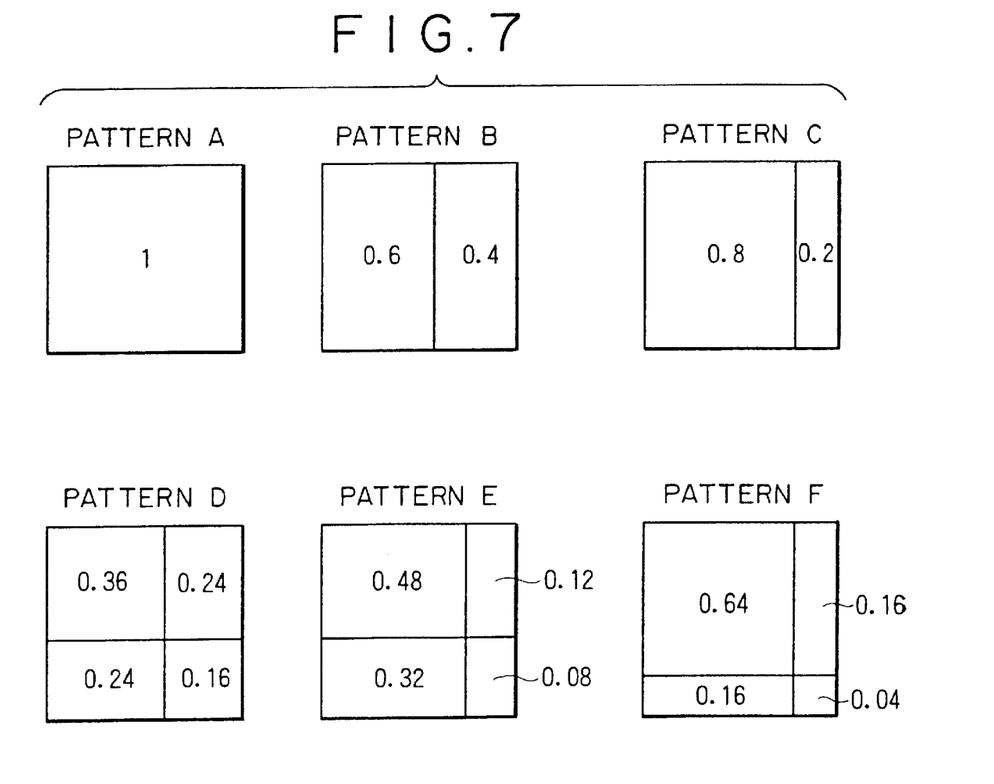
FIG. 7 shows kinds of patterns.

In the above explanation, pixel $x_{m,n}$ is composed of pixels $y_{v,w}$. Now the following explanation will be given on a reverse case where pixel $y_{v,w}$ is composed of pixels $x_{m,n}$. Pixel $y_{1,1}$ is composed merely of pixel $x_{1,1}$ alone, and pixel $y_{1,2}$ is composed of pixel $x_{1,1}$ by 60% and pixel $x_{1,2}$ by 40%. Similarly, pixel $y_{2,2}$ is composed of pixel $x_{1,1}$ by 36%, pixels $x_{1,2}$ and $x_{2,1}$ by 24%, and pixel $x_{2,2}$ by remaining 16%. Other pixel $y_{v,w}$ is composed of one to four pixels $x_{m,n}$, and the proportions of such pixels $x_{m,n}$ are dependent on the positions thereof. As a result of classifying such proportions, it is found that six kinds of patterns are existent, as shown in FIG. 7.

First, pattern A denotes that one pixel $y_{v,w}$ is composed of one pixel $x_{m,n}$. In pattern B, one pixel $y_{v,w}$ is composed of two adjacent pixels $x_{m,n}$ and $x_{m,n+1}$. Although two pixels in this example are horizontally adjacent pixels $x_{m,n}$ and $x_{m,n+1}$, a combination may be composed of two vertically adjacent pixels as well. More specifically, in addition to the example of FIG. 7 where 0.6 and 0.4 are disposed on the left and right sides respectively, pattern B includes an inverse combination where 0.4 and 0.6 are disposed on the left and right sides respectively. Pattern B further includes a case where 0.6 and 0.4 are disposed on the upper and lower sides respectively, and another case where 0.4 and 0.6 are disposed on the upper and lower sides respectively. With respect to any of the other patterns C to F also, inverse patterns relative to the left-right sides and the upper-lower sides are regarded as the same patterns. Each of the numerical values such as 0.6 or 0.4 is a coefficient used for a calculation executed in the calculator 24. Hereinafter each of such numerical values will be referred to as a calculation coefficient.

Figure 8:
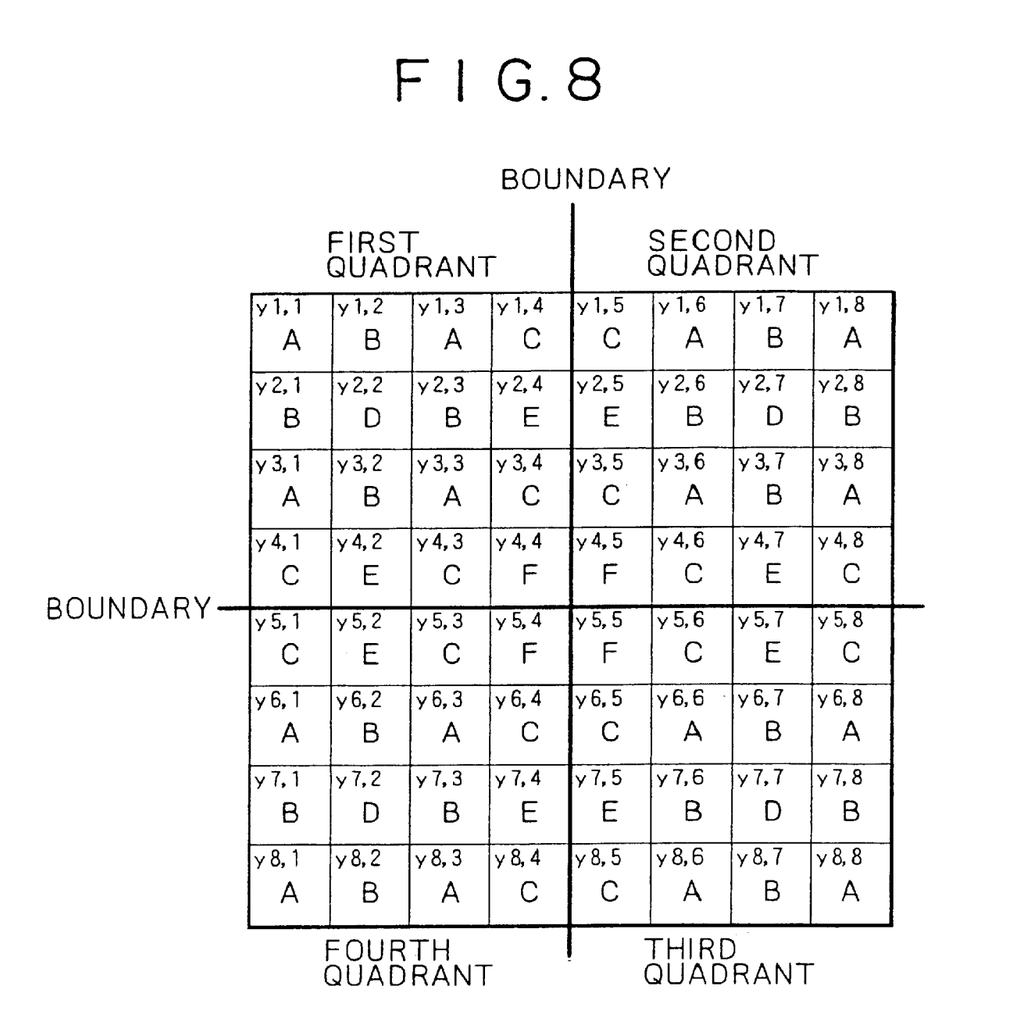
FIG. 8 shows an XGA-format picture classified according to the patterns of FIG. 7.

FIG. 8 shows the result of rewriting the XGA-format image block by the use of patterns A to F. As shown, the XGA-format image block has a combination of some patterns in the first to fourth quadrants. In the calculation data selector 23, there is stored a table of entire pattern data $Y_{1,1}$ to $Y_{8,8}$ in the first to fourth quadrants (the data in this table are denoted as $Y_{v,w}$ for distinction from the aforementioned data $y_{v,w}$) and only the calculation coefficients of the six patterns shown in FIG. 7 are stored in the calculation coefficient selector 28.

Next, the operation of the pixel number converter 10 shown in FIG. 2 will be described below with reference to a flowchart of FIG. 9. First at step S1, image data and a vertical sync signal V1 and a horizontal sync signal H1 are inputted from the personal computer 1 to the pixel number converter 10. The vertical sync signal V1 and the horizontal sync signal H1 thus inputted to the pixel number converter 10 are supplied to the control signal generator 26. Then the control signal generator 26 generates a clock signal C1 synchronized with the input vertical sync signal V1 and horizontal sync signal H1.

The clock signal C1 thus generated in the control signal generator 26 is inputted to the A/D converter 21 together with the image data inputted to the pixel number converter 10. Meanwhile, the vertical sync signal V1 and the horizontal sync signal H1 are inputted also to the calculation control signal generator 27.

At step S2, the image data inputted to the A/D converter 21 is converted into digital image data, which is then outputted to and stored in the frame memory 22. In the frame memory 22, the pixels are arranged in the same manner as in a display state. And the positions of the pixels in the image can be judged with facility by the addresses given to the individual pixels.

The control signal generator 26 generates a control signal in accordance with the input vertical sync signal V1, horizontal sync signal H1 and clock signal C1 so as to store the image data in the frame memory 22, thereby controlling the image data recording operation of the frame memory 22.

At step S3, the calculation control signal generator 27 generates a vertical sync signal V2 and a horizontal sync signal H2 for a new image signal in synchronism with the input vertical sync signal V1 and horizontal sync signal H1. Subsequently the calculation control signal generator 27 further generates, on the basis of the signals thus generated, an address $y_{v',w'}$ (where v'=1 to 768, w'=1 to 1024) of the relevant pixel to be calculated (pixel to be converted). The address thus generated is outputted to the calculation data selector 23.

At step S4, the calculation data selector 23 decides, out of the entire pixels in image blocks $Y_{1,1}$ to $Y_{8,8}$ shown in FIG. 8, one pixel indicated by the input address $y_{v',w'}$. Such decision of one pixel is performed by dividing v' and w' by 8 respectively and finding the remainders. Hereinafter this process will be explained with regard to three examples of addresses $y_{2,2}$, $y_{1,1024}$ and $y_{322,324}$.

In the case of address $y_{2,2}$ where v'=2 and w'=2, the remainders obtained through division by 8 are 2 and 2 respectively. On the basis of this result, address $y_{2,2}$ is decided to correspond to image block $y_{2,2}$. Similarly, in the case of address $y_{1,1024}$ where v'=1 and w'=1024, the remainders obtained through division by 8 are 1 and 0 relative to v' and w' respectively, so that address $y_{1,1024}$ is decided to correspond to image block $Y_{1,0}$. However, $Y_{1,0}$ is not existent in any of the 8×8 image blocks. In order to eliminate such a disadvantage, 8 is set instead when the remainder is 0. Due to this setting, address $y_{1,1024}$ is decided to correspond to image block $Y_{1,8}$.

Further in the case of address $Y_{322,324}$, the remainders obtained through division by 8 similarly to the above are 2 and 4 relative to v' and w' respectively. On the basis of this result, address $y_{322,324}$ is decided to correspond to image block $Y_{2,4}$.

The operation proceeds to step S5 after the calculation data selector 23 has thus decided the pixel $Y_{v,w}$ in the image block corresponding to the input address $y_{v',w'}$. At step S5, the calculation data selector 23 decides, out of the entire patterns A to F shown in FIG. 7, one pattern indicated by pixel $Y_{v,w}$ in the relevant image block. For example, since addresses $y_{2,2}$, $y_{1,1024}$ and $y_{322,324}$ mentioned above indicate image blocks $y_{2,2}$, $y_{1,8}$ and $y_{2,4}$ respectively, it is decided that these addresses correspond to pattern D, pattern A and pattern E respectively.

In this manner, the calculation data selector 23 decides a desired pattern and then reads out, from the frame memory 22, the image data required for calculating the image data of the subject pixel. While reading the image data, the calculation data selector 23 outputs, at step S6, the decided pattern to the the calculation coefficient selector 28 and then enables the same to select and output the corresponding calculation coefficient to the calculator 24.

At step S7, the calculation data selector 23 outputs to the calculator 24 the image data read out at step S5. In this case, the image data arrangement (output order) is changed in conformity with the arrangement of the calculation coefficients outputted from the calculation coefficient selector 28 to the calculator 24, and then the image data are outputted. Subsequently the calculator 24 calculates the XGA-format pixel data at step S8 by using the input image data and calculation coefficients.

Now the processes of steps S5 to S8 will be explained below with regard to examples of addresses $y_{2,2}$, $y_{1,1024}$ and $Y_{322,324}$ generated by the calculation control signal generator 27. First, it is seen from FIG. 6 that address $y_{2,2}$ is composed of pixels $x_{1,1}$, $x_{1,2}$, $x_{2,1}$ and $x_{2,2}$. Therefore, the pixel data read out from the frame memory 22 at step S5 are those of such pixels $x_{1,1}$, $x_{1,2}$, $x_{2,1}$ and $x_{2,2}$. The pixel data required for the calculation are read out from the frame memory 22 in the order from the upper left pixel of the picture to the upper right, lower left and lower right pixels thereof.

As described, address $y_{2,2}$ is decided to have the same pattern D as $Y_{2,2}$ in the first quadrant of the image block, so that the calculation coefficient selector 28 selects the calculation coefficients of pattern D and outputs the same to the calculator 24 at step S6.

More specifically, calculation coefficients of 0.36, 0.24, 0.24 and 0.16 are selected and outputted. These coefficients are stored in this order previously in the calculation coefficient selector 28. Explaining the coefficients with reference to the patterns shown in FIG. 7, the coefficients are stored in the order of upper left, upper right, lower left and lower right. The calculation coefficients are described below within parentheses in the recorded order with the individual patterns.

Pattern A (1)
Pattern B (0.6, 0.4)
Pattern C (0.8, 0.2)
Pattern D (0.36, 0.24, 0.24, 0.16)
Pattern E (0.48, 0.12, 0.32, 0.08)
Pattern F (0.64, 0.16, 0.16, 0.04)

At step S7, the pixel data $x_{1,1}$, $x_{1,2}$, $x_{2,1}$ and $x_{2,2}$ read out by the calculation data selector 23 are reordered into a data arrangement adapted for the calculation to be executed by the calculator 24. In this example, the arrangement of the coefficients and that of the pixel data are the same, i.e., in the order of upper left, upper right, lower left and lower right, so that no reorder is necessary. And the pixel data at address $y_{2,2}$ is calculated as shown in the following equation.

$$y_{2,2} = 0.36 \times x_{1,1} + 0.24 \times x_{1,2} + 0.24 \times x_{2,1} + 0.16 \times x_{2,2}$$

Next, an explanation will be given on another case where the address generated at step S3 is $y_{1,1024}$. At step S4, address $Y_{1,1024}$ is decided to be a pixel corresponding to $y_{1,8}$ in the image block, and is decided to have pattern A. Consequently, one pixel data $x_{1,640}$ is read out from the frame memory 22 at step S5, and a calculation coefficient (1) is read out from the calculation coefficient selector 28 at step S6.

Subsequently the pixel data arrangement is changed at step S7. In this example, however, no change is necessary since merely one pixel data and one calculation coefficient are existent. Therefore the pixel data read out from the frame memory 22 is outputted directly to the calculator 24. Then the calculator 24 calculates the pixel data according to the following equation.

$$y_{1,1024} = 1 \times x_{1,640}$$

Next, an explanation will be given on a further case where the address generated at step S3 is $Y_{322,324}$. At step S4, address $y_{322,324}$ is decided to be a pixel corresponding to $y_{2,4}$ in the image block, and is decided to have pattern E. Consequently, four pixel data $x_{201,202}$, $x_{201,203}$, $x_{202,202}$ and $x_{202,203}$ are read out in this order from the frame memory 22 at step S5. And calculation coefficients (0.48, 0.12, 0.32, 0.08) are read out from the calculation coefficient selector 28 at step S6.

The pixel data arrangement is changed at step S7. As seen from a comparison of $y_{2,4}$ in FIG. 6 with pattern E in FIG. 7, the pixel data in this case are in a reverse positional relationship with respect to left and right. It is therefore necessary to change the arrangement of the pixel data read out from the frame memory 22 in a manner to invert the positional relationship with respect to left and right and then to output the rearranged pixel data to the calculator 24. More specifically, the pixel data are rearranged to $x_{201,203}$, $x_{201,202}$, $x_{202,203}$ and $x_{202,202}$ and are outputted in this order. In response to output of the pixel data thus reordered, the calculator 24 calculates the pixel data at address $y_{322,324}$ according to the following equation.

$$y_{322,324} = 0.48 \times x_{201,203} + 0.12 \times x_{201,202} + 0.32 \times x_{202,203} + 0.08 \times x_{202,202}$$

Figure 9:
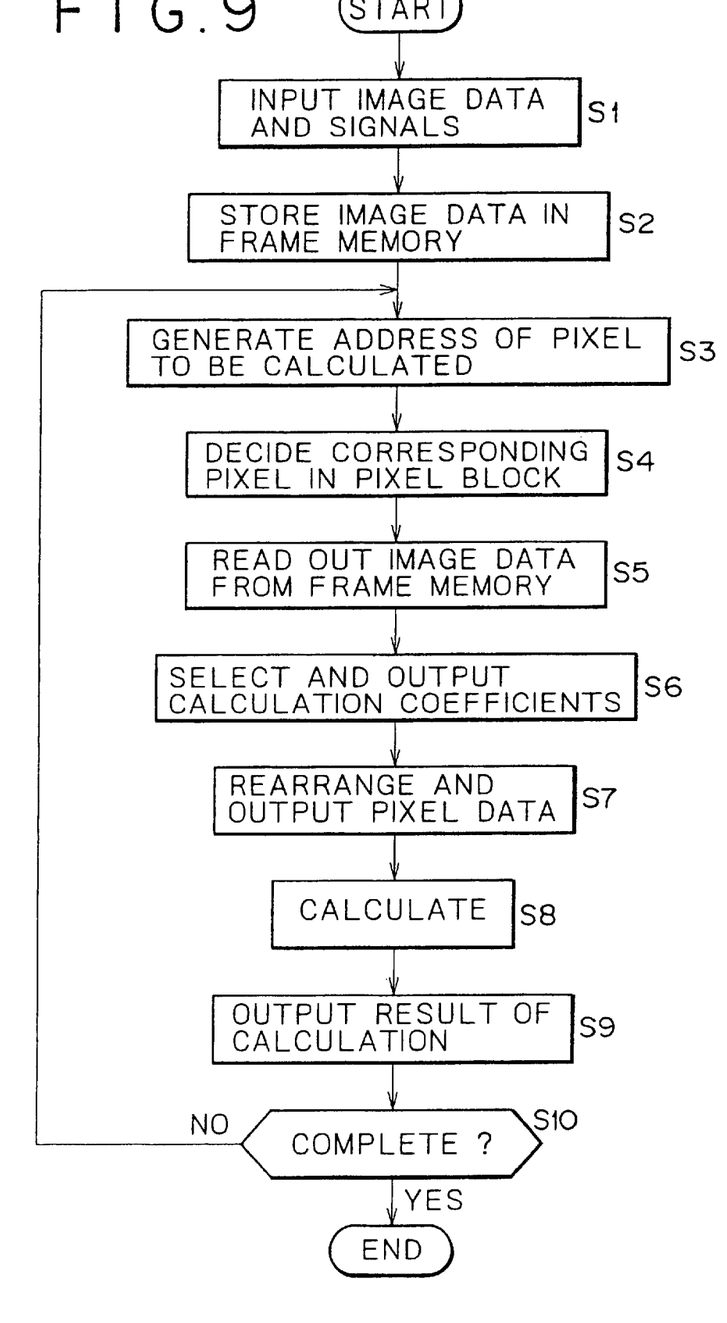
FIG. 9 is a flowchart for explaining the operation of the pixel number converter.

Referring back to the flowchart of FIG. 9, the operation proceeds to step S9 upon completion of the calculation executed in the calculator 24 as described. At step S9, the calculator 24 outputs the calculated pixel data to the D/A converter 25. Then the D/A converter 25 converts the input digital pixel data into analog pixel data and outputs the same to the LCD projector 4.

At step S10, a decision is made as to whether the operation of converting the number of pixels has been completed or not. In other words, this process is a decision to ascertain whether the entire pixel data stored in the frame memory 22 have been read out or not. If the result of this decision is affirmative to signify that the entire pixel data have been read out, the routine in this flowchart is terminated. Meanwhile, if the result of the above decision is negative to signify that the entire pixel data have not yet been read out, the operation returns to step S3, and the subsequent processes are executed repeatedly.

Hereinafter a processing routine for reduction will be explained with an example of converting an XGA-format image block into a VGA-format image block. In this case, an image block of 8×8 pixels is converted into an image block of 5×5 pixels. Therefore, the reduction ratio is 0.6 according to FIG. 3.

Figure 10:
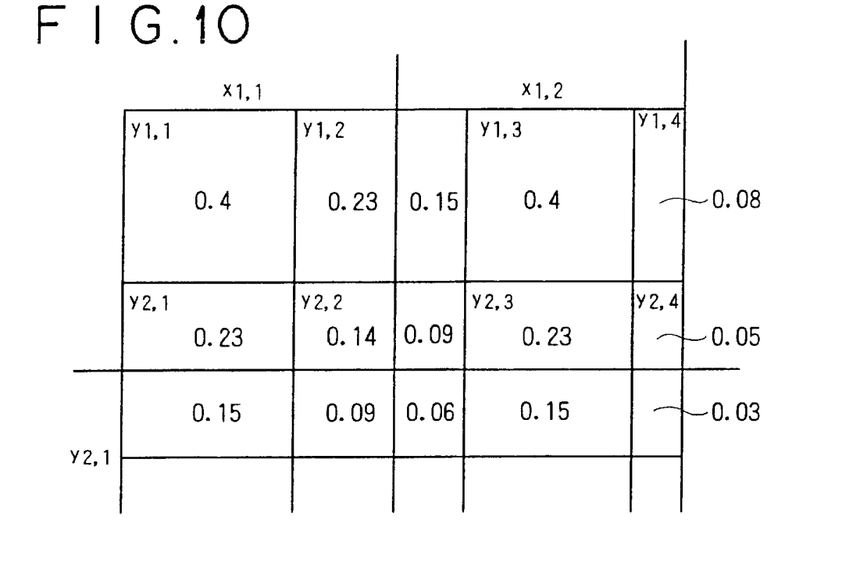
FIG. 10 is an explanatory diagram showing how the number of pixels is converted in an example of converting an XGA format into a VGA format.

As already described in connection with FIG. 5, pixel $x_{1,1}$ is composed of pixels $y_{1,1}$, $y_{1,2}$, $y_{2,1}$ and $y_{2,2}$. Here, regarding the pixels $x_{1,1}$ and $x_{1,2}$ as examples, the proportions of such composition will be explained below with reference to FIG. 10. First, pixel $x_{1,1}$ is composed of pixel $y_{1,1}$ by 40% (0.4), pixels $y_{1,2}$ and $y_{2,1}$ each by 23% (0.23), and pixel pixel $y_{2,2}$ by 14% (0.14). Meanwhile, pixel $x_{1,2}$ is composed of $y_{1,2}$ by 15%, pixel $y_{1,3}$ by 40%, pixel $y_{1,4}$ by 8%, pixel $y_{2,2}$ by 9%, pixel $y_{2,3}$ by 23%, and pixel $y_{2,4}$ by 5%.

Figure 11:
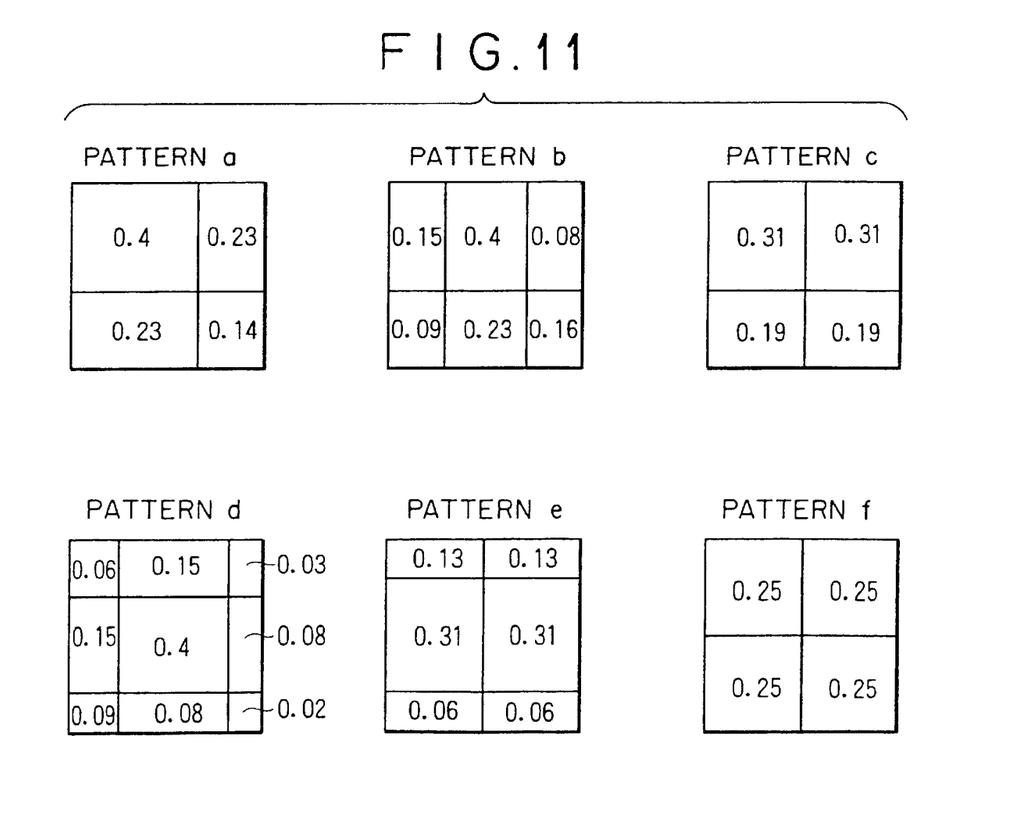
FIG. 11 shows kinds of patterns.

Similarly, other pixel $x_{m,n}$ is also composed of a plurality of pixels $y_{v,w}$, and the proportions of such pixels $y_{v,w}$ are dependent on the positions thereof. As a result of classifying such proportions, it is found that six kinds of patterns a to f are existent, as shown in FIG. 11.

First, pattern a denotes that one pixel $x_{m,n}$ is composed of four pixels $y_{v,w}$, $y_{v,w+1}$, $y_{v+1,w}$ and $y_{v+1,w+1}$ in this order from the upper left pixel. In the example of FIG. 11, there are disposed 0.4, 0.23, 0.23 and 0.14 at the upper left, upper right, lower right and lower left positions respectively. However, an inverse pattern of pixels at changed positions is also regarded as pattern a. Similarly, with respect to any of the other patterns b to f also, inverse patterns relative to the left-right and upper-lower positions are regarded as the same patterns.

Figure 12:
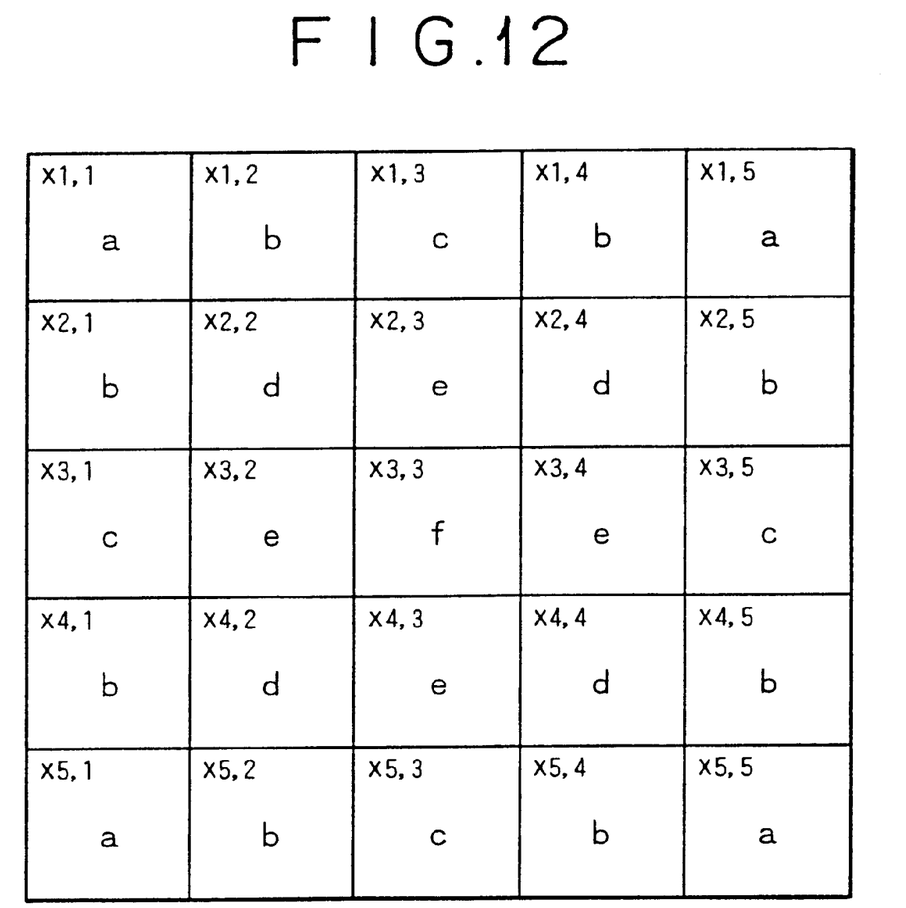
FIG. 12 shows a VGA-format picture classified according to the patterns of FIG. 11.

FIG. 12 shows the result of rewriting the VGA format 5×5 image block by the use of such patterns a to f. The table of these patterns is stored in the calculation data selector 23. And the calculation coefficients of the patterns shown in FIG. 11 are stored in the calculation coefficient selector 28.

The operation of the pixel number converter 10 in the reduction mode is performed in accordance with the flowchart of FIG. 9 as in the aforementioned enlargement mode. Therefore a repeated explanation is omitted here, and only the calculations thereof will be described below.

The calculation coefficients stored in the calculation coefficient selector 28 are in the following arrangement, which is determined according to the patterns shown in FIG. 11.

Pattern a (0.4, 0.23, 0.23, 0.14)

Pattern b (0.15, 0.4, 0.08, 0.09, 0.23, 0.05)

Pattern c (0.31, 0.31, 0.19, 0.19)

Pattern d (0.06, 0.15, 0.03, 0.15, 0.4, 0.08, 0.03, 0.08, 0.02)

Pattern e (0.13, 0.13, 0.31, 0.31, 0.06, 0.06)

Pattern f (0.25, 0.25, 0.25, 0.25)

The address generated at step S3 in the flowchart of FIG. 9 is $x_{m',n'}$ (where m'=1 to 480, n'=1 to 640) based on the VGA format. And a decision of the relevant pixel in the image block is executed at step S4 by dividing m' and n' by 5 respectively and obtaining the remainders thereof. As already described in connection with the enlargement mode, when the remainder is 0, it is set to 5 instead of 0. In the case of address $x_{1,1}$ for example, m'=1 and n'=1. And if each of m' and n' is divided by 5, the remainder is 1. Therefore, the address $x_{1,1}$ is decided to be relevant to $x_{1,1}$ in the image block, and its pattern is decided to be pattern a.

In the case of address $x_{480,640}$, m'=480 and n'=640, so that if each of m' and n' is divided by 5, the remainder is 0. Therefore, the address $x_{480,640}$ is decided to be relevant to $x_{5,5}$ in the image block, and its pattern is decided to be pattern a.

After the relevant pixel in the image block and its pattern have thus been decided, the image data is read out at step S5. In the above examples where the addresses are $x_{1,1}$ and $x_{480,640}$, the pattern in each case is decided to be pattern a, so that the image data of four pixels are read out. More specifically, in the case of address $x_{1,1}$, the image data of pixels $y_{1,1}$, $y_{1,2}$, $y_{2,1}$ and $y_{2,2}$ are read out in this order. In the case of address $x_{480,640}$, the image data of pixels $y_{767,1023}$, $y_{767,1024}$, $y_{768,1023}$ and $y_{768,1024}$ are read out in this order.

Since each of addresses $x_{1,1}$ and $x_{480,640}$ is decided to have pattern a, the calculation coefficients selected by the calculation coefficient selector 28 and outputted to the calculator 24 at step S6 are 0.4, 0.23, 0.23 and 0.14.

Subsequently at step S7, the pixel data arrangement is changed. In this example of address $x_{1,1}$ where the arrangement of the read pixel data and that of the calculation coefficients are the same, the arrangement need not be changed. Therefore, the pixel data read out from the frame memory 22 by the calculation data selector 23 are outputted directly to the calculator 24 without any change of the arrangement. In response to such direct output, the calculator 24 calculates the new pixel data according to the following equation.

$$x_{1,1}=0.4 \times y_{1,1}+0.23 \times y_{1,2}+0.23 \times y_{2,1}+0.14 \times y_{2,2}$$

Although address $x_{480,640}$ has the same pattern a, the arrangement of its calculation coefficients is different from that of address $x_{1,1}$, and the positional relationship is inverse both horizontally and vertically. In this case where the arrangement of the calculation coefficients is fixed, the arrangement of the pixel data read out from the frame memory 22 needs to be changed and outputted to the calculator 24. More specifically, the calculation data selector 23 changes the read pixel data arrangement Of $y_{767,1023}$, $y_{767,1024}$, $y_{768,1023}$ and $y_{768,1024}$ to a data arrangement of $y_{768,1024}$, $y_{768,1023}$, $y_{767,1024}$ and $y_{767,1023}$, and then outputs the same to the calculator 24. In response to such output, the calculator 24 calculates the new pixel data according to the following equation.

$$x_{480,640}=0.4 \times y_{768,1024}+0.23 \times y_{768,1023}+0.23 \times y_{767,1024}+0.14 \times y_{767,1023}$$

Thus, when enlarging or reducing an image by converting the number of its pixels, new pixel data are calculated after the coefficients to be used for calculation are selectively changed in conformity with the positions of the pixels, so that any character string converted exactly without blur of the characters. It is a matter of course that the present invention is applicable also to any of general images such as natural pictures containing none of sharp variations.

In the above description, the arrangement of the calculation coefficients is kept fixed while the pixel data read out from the frame memory 22 are rearranged to be adapted for calculation. However, the arrangement of the pixel data read out from the frame memory 22 may be used directly without any change while the calculation coefficients may be rearranged to be adapted for calculation. Although the above description concerns the VGA and XGA formats taken as examples, it is needless to say that the present invention is applicable to any other format as well.

The calculation coefficients recorded in the calculation coefficient selector 28 are not limited merely to the aforementioned values alone, and the values may be so set that none of the calculation coefficients is smaller than 0.1, for example. Further in the above description, the calculation coefficients are determined on the basis of area ratios. However, depending on the image information, the coefficients may be determined on the basis of some other factors than such area ratios in combination with, for example, a cubic mode or the like according to the pixel position.

Figure 15:
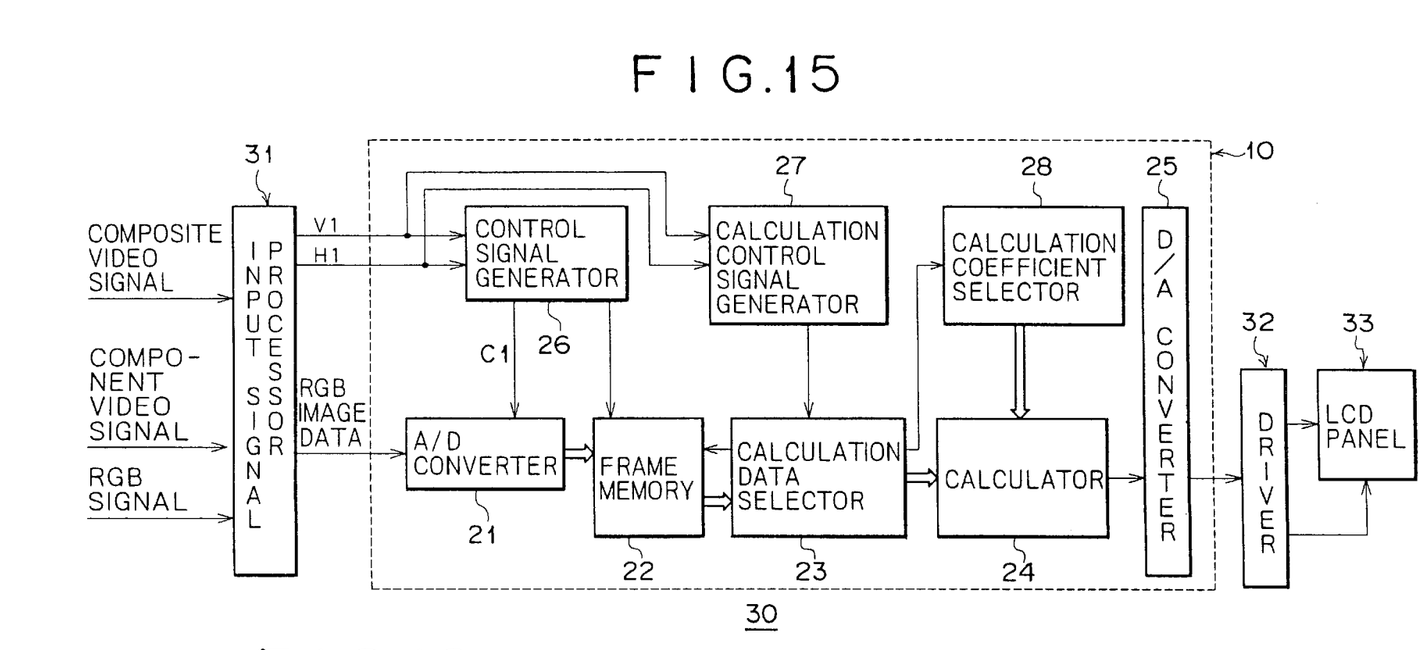
FIG. 15 is a block diagram showing the configuration of another preferred embodiment which represents an LCD projector equipped with the image data processing apparatus of the present invention.
Figure 16:
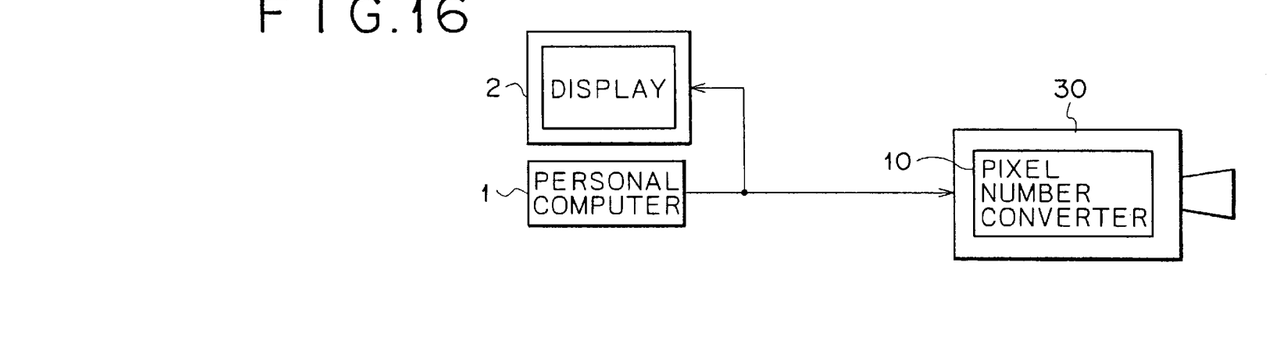
FIG. 16 is a block diagram showing the configuration of a display system which employs an LCD projector equipped with the image data processing apparatus of the present invention.

Also in the above description, the pixel number converter 10 serves as a sole device to supply the converted image data to the LCD projector 4. However, the present invention is not limited to such embodiment alone. For example, the configuration may be so modified as shown in FIG. 16, wherein the pixel number converter 10 is incorporated in an LCD projector 30, and the output of the personal computer 1 is supplied directly to the LCD projector 30, and then the signal processed therein is displayed. The internal structure of the LCD projector 30 in such configuration is shown in FIG. 15.

Normally the LCD projector 30 has a plurality of input terminals to receive various inputs such as composite video signal, component video signal, RGB signals and forth. And in most cases, such LCD projector 30 is equipped with a scan converter to execute a process of pixel number conversion for displaying signals of different numbers of pixels on its LCD panel 33 of a predetermined number of pixels. The pixel number converter 10 is used as a scan converter.

The image signal outputted from an apparatus connected to a predetermined input terminal, e.g., from the personal computer 1, is supplied to the input signal processor 31 of the LCD projector 30. In the input signal processor 31, sync separation of video signal, decoding of RGB signals and so forth are performed as required. And then the horizontal sync signal H1, the vertical sync signal V1 and the RGB image data processed in and outputted from the input signal processor 31 are supplied to the pixel number converter 10 which serves as a scan converter. The structure of this pixel number converter 10 is the same as that of the aforementioned pixel number converter 10, and the operation performed therein is also the same as that mentioned already. For this reason, a repeated explanation thereof is omitted here.

The image data outputted from the pixel number converter 10 is supplied to a driver 32. Subsequently the driver 32 modulates an LCD panel 33 in accordance with the input image data. Although not shown, light emitted from a light source is irradiated to the LCD panel 33 by the use of an optical means and then is projected onto a screen or the like, so that the image data can be displayed thereon. As the pixel number converter 10 of the present invention is thus incorporated in the LCD projector 30, it becomes possible to realize a low-cost LCD projector which is capable of executing exact pixel number conversion without causing blur in any image to be processed with sharp conversion.

Although an LCD projector 4 (30) is employed as a display device in the above description, the projector is not limited threrto alone, and it is possible to employ any other display device having a predetermined total number of fixed pixels, such as a projection type display device with a reflective space modulation element represented by a digital mirror device (DMD), or a direct viewing type display device represented by a plasma display (PDP) or light emitting diode (LED).

It is to be understood that, in this specification, the provision medium for providing to users a computer program to execute the above processing routine includes any information recording medium such as magnetic disk or CD-ROM, and also any transmission medium using a network such as Internet or digital satellite.

Thus, according to the image data processing apparatus, the image data processing method and the provision medium of the present invention, input pixel data of a first image are stored while a plurality of calculation coefficients are stored, then a desired calculation expression corresponding to the positions of pixels in a second image is selected, subsequently the pixel data of the first image to be used for calculation of the selected expression are read out while the coefficients to be used for calculation of the selected expression are read out, and the pixel data of the second image are calculated by the use of the pixel data and the coefficients thus read out. Consequently, in enlarging or reducing the image, it becomes possible to execute a satisfactory pixel number conversion of the image data, such as a character string which contains sharp variations, without causing any blur or deformation of the post-conversion image.

What is claimed is:

1. An image data processing apparatus for converting a first image of $M_1 \times N_1$ pixel data into a second image of $M_2 \times N_2$ pixel data, comprising:

a first storage means for storing the input pixel data of said first image;

a second storage means for storing tables of area ratio pattern coefficients for plural calculation expressions;

a select means for selecting a calculation expression corresponding to an area ratio pattern determined by the shared area ratio between a subject pixel of said second image and the pixels of said first image overlapping said subject pixel when said first and second images are made equal in size and superimposed; and a calculator means for calculating the pixel data of said second image by the use of the pixel data of said first image, the selected calculation expression, and the area ratio pattern coefficients corresponding to the selected calculation expression.

2. An image data processing method carried out in an image data processing apparatus for converting a first image of $M_1 \times N_1$ pixel data into a second image of $M_2 \times N_2$ pixel data, said method comprising:

a first storage step of storing the input pixel data of said first image;

a second storage step of storing tables of area ratio pattern coefficients for plural calculation expressions;

a select step of selecting a calculation expression corresponding to an area ratio pattern determined by the shared area ratio between a subject pixel of said second image and the pixels of said first image overlapping said subject pixel when said first and second images are made equal in size and superimposed; and a calculation step of calculating the pixel data of said second image by the use of the pixel data of said first image, the calculation expression selected at said select step, and the area ratio pattern coefficients corresponding to the selected calculation expression.

3. A provision medium for providing a program, which is readable by a computer to execute a predetermined process, to an image data processing apparatus for converting a first image of $M_1 \times N_1$ pixel data into a second image of $M_2 \times N_2$ pixel data, said process comprising:

a first storage step of storing the input pixel data of said first image;

a second storage step of storing tables of area ratio pattern coefficients for plural calculation expressions;

a select step of selecting a calculation expression corresponding to an area ratio pattern determined by the shared area ratio between a subject pixel of said second image and the pixels of said first image overlapping said subject pixel when said first and second images are made equal in size and superimposed; and a calculation step of calculating the pixel data of said second image by the use of the pixel data of said first image, the calculation expression selected at said select step, and the area ratio pattern coefficients corresponding to the selected calculation expression.

4. A display device for displaying a first image of $M_1 \times N_1$ pixel data converted into a second image of $M_2 \times N_2$ pixel data, comprising:

a first storage means for storing the input pixel data of said first image;

a second storage means for storing tables of area ratio pattern coefficients for plural calculation expressions;

a select means for selecting a calculation expression corresponding to an area ratio pattern determined by the shared area ratio between a subject pixel of said second image and the pixels of said first image overlapping said subject pixel when said first and second images are made equal in size and superimposed;

a calculator means for calculating the pixel data of said second image by the use of the pixel data of said first image, the selected calculation expression, and the area ratio pattern coefficients corresponding to the selected calculation expression; and a display means for displaying the image based on the pixel data of said second image calculated said calculator means.

* * * * *